United States Patent [19]
Nakadate

[11] Patent Number: 6,119,829
[45] Date of Patent: Sep. 19, 2000

[54] HYDRAULIC SHOCK ABSORBER WITH VARIABLE DAMPING RESISTANCE

[75] Inventor: Takao Nakadate, Kanagawa-ken, Japan

[73] Assignee: Tokico Ltd., Kawasaki, Japan

[21] Appl. No.: 09/158,883

[22] Filed: Sep. 23, 1998

[30] Foreign Application Priority Data

Sep. 24, 1997 [JP] Japan .................................. 9-276385

[51] Int. Cl.⁷ .............................. B60G 17/08; F16F 9/50
[52] U.S. Cl. .................................... 188/266.6; 188/322.13
[58] Field of Search ................. 188/266.6, 282.1–282.6, 188/282.8, 315, 322.13

[56] References Cited

U.S. PATENT DOCUMENTS

| | | | |
|---|---|---|---|
| 5,649,611 | 7/1997 | Nakadate | 188/322.13 |
| 5,655,633 | 8/1997 | Nakadate et al. | 188/322.13 |
| 5,901,820 | 5/1999 | Kashiwagi et al. | 188/322.13 |
| 5,934,421 | 8/1999 | Nakadate et al. | 188/322.13 |

*Primary Examiner*—Christopher P. Schwartz
*Attorney, Agent, or Firm*—Wenderoth, Lind & Ponack, L.L.P.

[57] ABSTRACT

A hydraulic shock absorber includes disc valves seated on valve seats, and annular retainer discs having a diameter less than that of the valve seat. The retainer discs are guided by spacers and axially separable from the disc valves. Annular seal discs are disposed downstream of the disc valves. The inner periphery of the seal discs is partly overlapped with the outer periphery of the retainer discs. The outer peripheral edge of the retainer discs is in substantially linear contact with the disc valves. This arrangement restricts frictional resistance between the disc valves and the retainer discs when the disc valves are flexed and opened.

27 Claims, 6 Drawing Sheets

← EXTENSION STROKE
←--- COMPRESSION STROKE

HYDRAULIC SHOCK ABSORBER WITH VARIABLE DAMPING RESISTANCE

BACKGROUND OF THE INVENTION

The present invention relates to hydraulic shock absorbers with variable damping resistance or force, especially for use in vehicle suspension systems.

There has been proposed a hydraulic shock absorber for use in vehicle suspension systems, designed to adjust damping resistance so as to improve riding comfort and steerability in response to road and running conditions.

A typical hydraulic shock absorber includes a piston assembly within which a primary oil passage is defined, as disclosed in Japanese laid-open utility model publication No. Sho 62-167950. A pressure chamber is defined downstream of a main valve as a damper mechanism and communicated with upstream and downstream cylinder chambers through fixed and variable orifices, respectively.

In such a conventional hydraulic shock absorber, the variable orifice is opened and closed so as to adjust the effective cross sectional area of a fluid path between the upstream and downstream cylinder chambers and also, adjust pressure within the pressure chamber necessary to open the main valve. During adjustment of the variable orifice, damping resistance is substantially proportional to the square of piston speed. During adjustment of the pressure within the pressure chamber, damping resistance is substantially proportional to piston speed. Thus, the related art shock absorber is able to achieve a wide range of damping adjustment.

The pressure chamber is defined by slidably fitting the main valve around a cylindrical valve guide. However, this arrangement causes oil leakage from sliding parts between the main valve and the valve guide. The viscosity of oil is varied depending on temperature and has an influence on oil leakage. In other words, damping resistance is varied in response to a change in temperature. Moreover, the related art shock absorber is expensive to manufacture since the sliding parts must be machined with high accuracy.

In order to solve the problems encountered in the related art shock absorber, the inventors of the present application previously proposed a hydraulic shock absorber wherein a disc valve, a retainer disc, a seal disc and other discs are arranged in a stack whereby a partition is formed between a main valve and a pressure chamber to prevent oil leakage, as disclosed by Japanese patent application No. Hei 8-283114. The inner periphery of the retainer disc is clamped or secured to an inner seal ridge of a valve body through the disc valve. In other words, the entire surface of the retainer disc is in surface contact with the disc valve. This arrangement results in an increase in frictional resistance between the disc valve and the retainer disc when the disc valve is opened against the bias of the retainer disc. Such an increase in frictional resistance causes unstable damping resistance.

Accordingly, it is an object of the present invention to provide a hydraulic shock absorber which provides a wide range of damping adjustment and gives stable damping resistance.

SUMMARY OF THE INVENTION

To achieve the foregoing object, the present invention provides a hydraulic shock absorber comprising a cylinder filled with a hydraulic fluid, such as oil, a piston slidably disposed within the cylinder, a piston rod having one end connected to the piston and the other end extending out of the cylinder, a primary passage through which the oil flows in response to sliding movement of the piston, a main damper valve arranged in the primary passage and having a valve body, a pilot chamber defined downstream of the valve body and designed to exert an internal pressure to close the main damper valve, an upstream passage for providing a fluid communication between the pilot chamber and a portion of the primary passage upstream of the main damper valve, a fixed orifice in the upstream passage, a downstream passage for providing a fluid communication between the pilot chamber and a portion of the primary passage downstream of the main damper valve, a variable orifice provided in the downstream passage and adapted to adjust the effective cross sectional area of the downstream passage, the main damper valve including an annular disc valve, said disc valve having an outer periphery seated on and separated from said valve seat so as to close and open said primary passage, an annular retainer disc disposed downstream of the disc valve and having a diameter less than that of the valve seat, said retainer disc having an inner periphery axially separable from the disc valve, and a flexible partition disposed downstream of the retainer disc and adapted to define the pilot chamber, said flexible partition being flexed toward the disc valve by an internal pressure within the pilot chamber so as to urge the disc valve through the retainer disc whereby the disc valve is closed.

With this arrangement, a change in the effective cross sectional area of the downstream passage through the variable orifice results in a corresponding change in the effective cross sectional area of a fluid path between the upper and lower cylinder chambers. Such a change enables adjustment of damping characteristics (i.e., orifice characteristic). A change in the internal pressure within the pilot chamber in response to a loss of pressure through the variable orifice results in a corresponding change in pressure necessary to open the damper valve. Such a change also enables adjustment of damping characteristics (i.e., valve characteristic). The pilot chamber is defined without the use of any sliding parts. This arrangement minimizes the possibility of oil leakage from the pilot chamber. The annular retainer disc, downstream of the disc valve, has a smaller diameter than the valve seat and has an inner periphery axially separable from the disc valve. The flexible partition is disposed downstream of the retainer disc and flexed toward the disc valve under the internal pressure within the pilot chamber so as to urge the disc valve into a closed position through the retainer disc. As the retainer disc is axially separable from the disc valve, the retainer disc is free from deformation and will in no way urge the disc valve when the disc valve is flexed and opened. This results in a decrease in frictional resistance between the disc valve and the retainer disc.

DETAILED DESCRIPTION OF THE INVENTION

Figure 1:
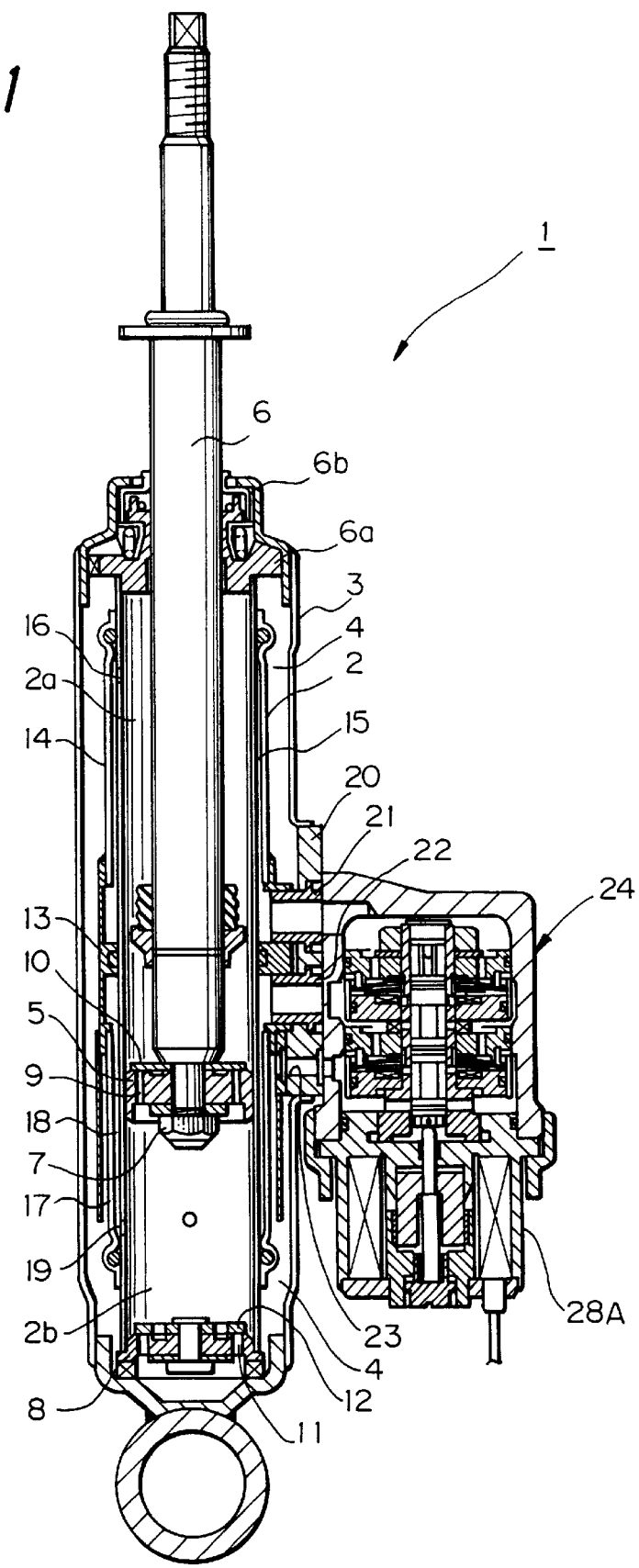
FIG. 1 is a vertical sectional view of a hydraulic shock absorber with variable damping resistance as assembled according a first embodiment of the present invention.

Referring to FIGS. 1 to 4, there is shown a hydraulic shock absorber with variable damping resistance or force as assembled according to a first embodiment of the present invention.

Specifically, a hydraulic shock absorber 1 includes two concentric cylinders, namely, an inner working cylinder 2 and an outer cylinder 3. A reservoir 4 is defined between the working cylinder 2 and the outer cylinder 3. A piston 5 is disposed within the working cylinder 2 to thereby divide the interior of the working cylinder 2 into an upper cylinder chamber 2a and a lower cylinder chamber 2b. A piston rod 6 has one end connected to the piston 5 by a nut 7. The other end of the piston rod 6 extends along the upper cylinder chamber 2a, through a rod guide 6a and a seal 6b, and out of the working cylinder 2. The rod guide 6a and the seal 6b are mounted in the upper end of the working cylinder 2 and the outer cylinder 3. A base valve 8 is mounted in the lower end of the working cylinder 2 so as to separate the lower cylinder chamber 2b from the reservoir 4. The working cylinder 2 is filled with oil. The reservoir 4 is filled with oil and gas.

An oil passage 9 is formed in the piston 5 so as to provide a fluid communication between the upper cylinder chamber 2a and the lower cylinder chamber 2b. A check valve 10 is also arranged in the piston 5 so as to allow the flow of oil from the lower cylinder chamber 2b to the upper cylinder chamber 2a through the oil passage 9. Similarly, an oil passage 11 is formed in the base valve 8 so as to provide a fluid communication between the lower cylinder chamber 2b and the reservoir 4. A check valve 12 is also arranged in the base valve 8 so as to allow the flow of oil from the reservoir 4 to the lower cylinder chamber 2b through the oil passage 11.

A substantially cylindrical member 13 extends around the working cylinder 2 intermediate the length of the working cylinder 2. An upper tube 14 extends around the upper part of the working cylinder 2 and is connected to the cylindrical member 13. An annular upper oil passage 15 is formed between the working cylinder 2 and the cylindrical member 13 and the upper tube 14. The upper oil passage 15 is communicated with the upper cylinder chamber 2a through an opening 16 which is formed near the upper end of the working cylinder 2. Similarly, a lower tube 17 extends around the lower end of the working cylinder 2 and is connected to the cylindrical member 13. An annular lower oil passage 18 is formed between the working cylinder 2 and the cylindrical member 13 and the lower tube 17. The lower oil passage 18 is communicated with the lower cylinder chamber 2b through an opening 19 which is formed near the lower end of the working cylinder 2. An adapter plate 20 is attached to the outer cylinder 3 in a confronting relation with respect to the cylindrical member 13. Two sleeves 21, 22 extend between the adapter plate 20 and the cylindrical member 13 and are communicated with the upper and lower oil passages 15, 18, respectively. A hole 23 is formed in the adapter plate 20 and is communicated with the reservoir 4. A damper mechanism 24 is mounted to the adapter plate 20.

Figure 2:
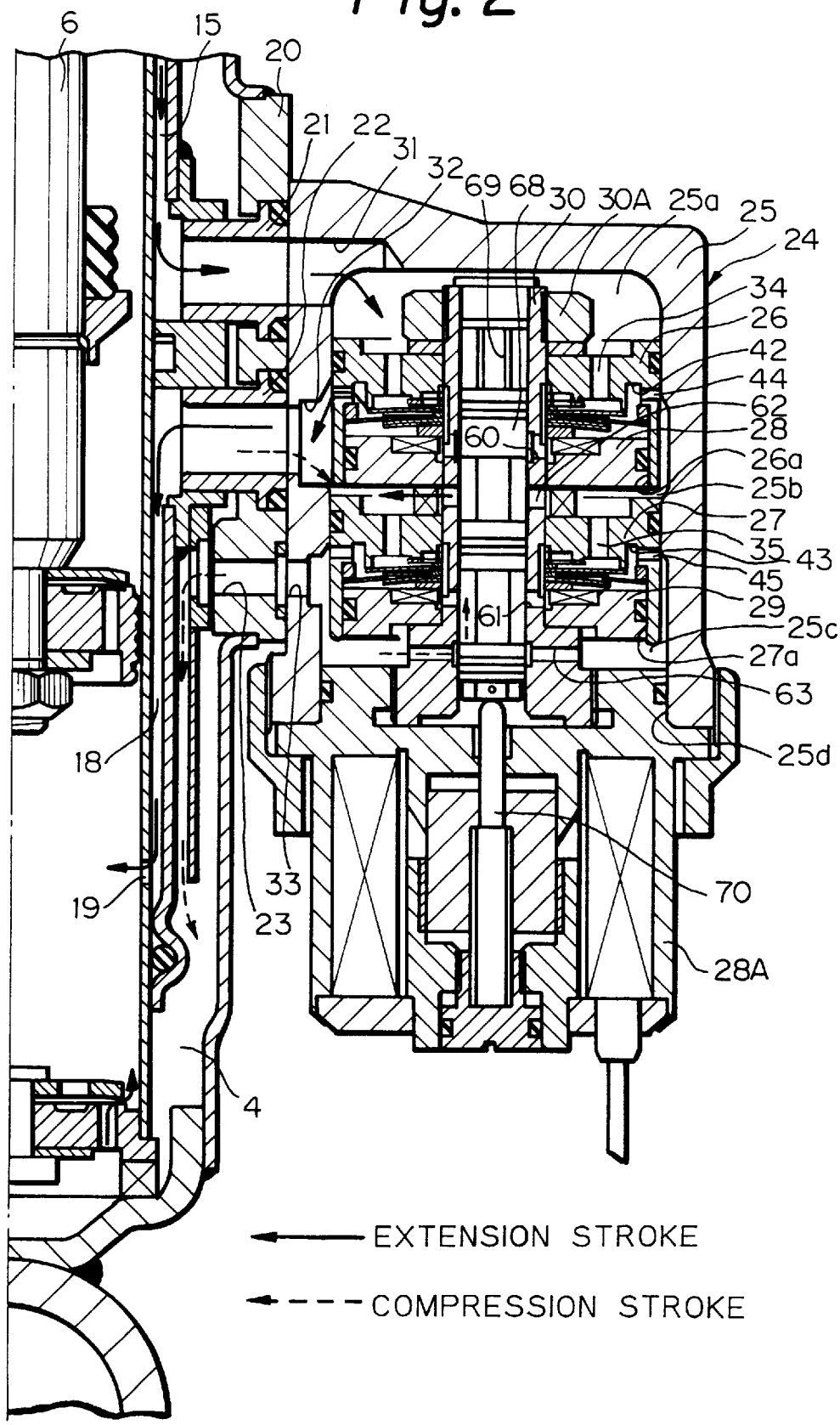
FIG. 2 is an enlarged sectional view of a damper mechanism shown in FIG. 1.

As shown in FIG. 2, the damper mechanism 24 includes a casing 25 with a closed top and an open bottom 25d. Two valve bodies 26, 27 are arranged in the casing 25 so as to define three oil chambers 25a, 25b, 25c in the casing 25. A proportional solenoid actuator 28A is fitted into the open bottom 25d of the casing 25. The valve bodies 26 and 27 have respective open bottoms 26a, 27a to which two respective end seals 28, 29 are fitted, respectively. A substantially cylindrical guide member 30 extends through the valve bodies 26, 27 and the end seals 28, 29. The lower end of the guide member 30 is threadably engaged with the actuator 28A. A nut 30A is secured to the upper end of the guide member 30 so as to hold the valve bodies 26, 27 in position. Three ports 31, 32, 33 are formed in the side wall of the casing 25 and communicated with the oil chambers 25a, 25b, 25c, respectively. The three ports 31, 32, 33 are also communicated with the sleeve 21, the sleeve 22 and the hole 23 in the adapter plate 20, respectively.

Figure 3:
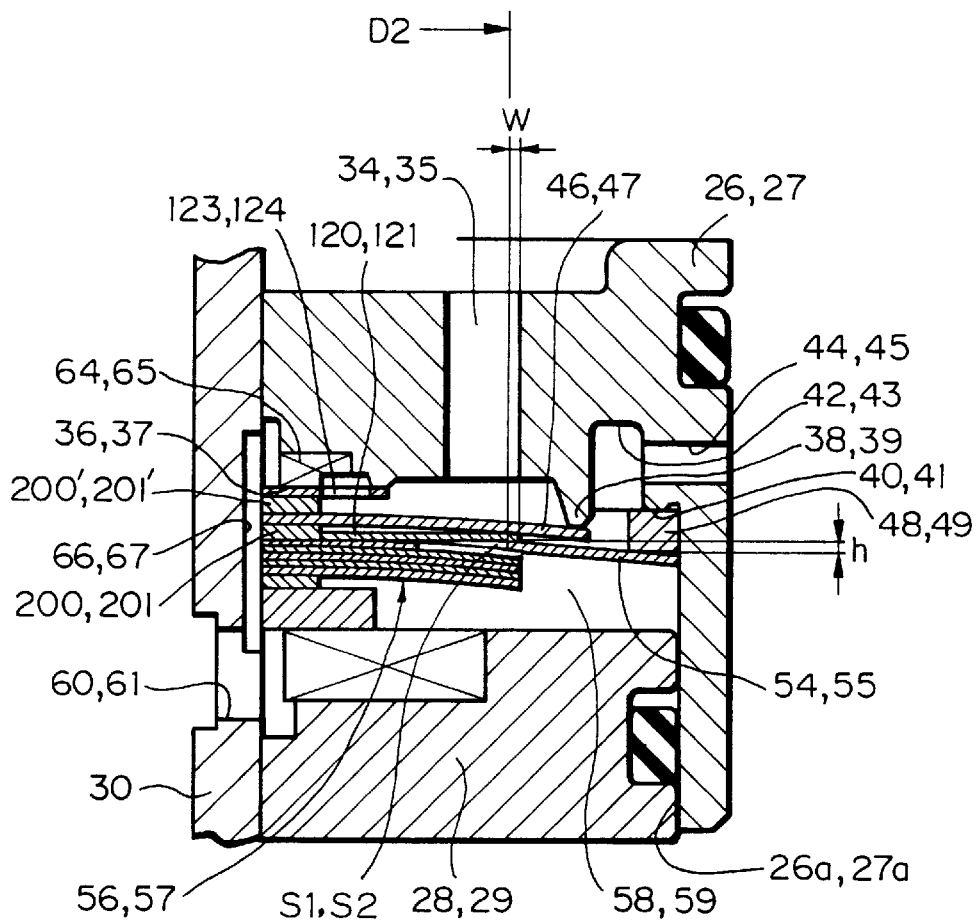
FIG. 3 is a sectional view, on an enlarged scale, of a primary damper valve and a pilot chamber shown in FIG., 2.

A plurality of axial oil passages or primary passages 34, 35 (only two are shown) are formed in the valve bodies 26, 27 in a circumferentially spaced relationship. As shown in FIG. 3, annular inner seal ridges 36, 37 are formed in the valve bodies 26, 27 radially inwardly of the oil passages 34, 35. Annular valve seats 38, 39 are formed in the valve bodies 26, 27 radially outwardly of the oil passages 34, 35. Annular outer seal ridges 40, 41 are formed in the valve bodies 26, 27 radially outwardly of the valve seats 38, 39 and radially inwardly of the side wall of the valve bodies 26, 27. Annular grooves or primary passages 42, 43 are formed between the valve seats 38, 39 and the outer seal ridges 40, 41 and communicated with the oil chambers 25b, 25c through oil passages 44, 45.

Disc valves 46, 47 are associated with the valve bodies 26, 27 and serve as the main valve elements of the damper mechanism. The inner periphery of each of the disc valves 46, 47 is fixed to the respective inner seal ridges 36, 37 through annular spacers 200', 201' and a respective ring member having orifices 123, 124 extending therethrough which have a constant cross-sectional area, i.e. fixed orifices 123, 124. The outer periphery of each of the disc valves 46, 47 is in contact with the respective valve seats 38, 39. Annular seal rings 48, 49 are fitted within the valve bodies 26, 27 and held in contact with the outer seal ridges 40, 41, respectively. Situated below the disc valves 46, 47 are annular retainer discs 120, 121. The retainer discs 120, 121 have a diameter less than that of the valve seats 38, 39. The radially inner portion of the retainer discs 120, 121 are axially movable on annular spacers 200, 201 which are, in turn, fixed to the inner seal ridges 36, 37 through the disc valves 46, 47, the spacers 200', 201' and the respective ring member having the fixed orifices 123, 124. The disc valves 46, 47 are subjected to pressure within pilot chambers 58, 59, which will be described later, through the retainer discs 120, 121. Thus, damping characteristics are dependent upon the outer diameter of the retainer discs 120, 121. The larger the outer diameter of the retainer discs 120, 121, the harder the damping characteristics. Without the retainer discs 120, 121, the pressure within the pilot chambers will be exerted on larger area of the disc valves. In such a case, damping resistance is varied depending largely upon pressure distribution within the pilot chambers. This results in unstable damping characteristics.

The valve bodies 26, 27 have respective recesses 26a, 27a in which annular seal discs 54, 55 are loosely fitted. The seal discs 54, 55 are located downstream of the disc valves 46, 47. The outer peripheral edge of the seal discs 54, 55 is in sliding contact with the inner wall of the valve bodies 26, 27. A portion of the upper surface of the seal discs 54, 55 adjacent to their outer periphery is held in contact with the seal rings 48, 49. The inner periphery of the seal discs 54, 55 is partly overlapped, designated as at W, with the radially outer portion of the retainer discs 120, 121. That is, the radially outer portion of the retainer discs 120, 121 is sandwiched between the disc valves 46, 47 and the seal discs 54, 55. The radially inner portion of the retainer discs 120, 121 is separable axially from the disc valves 46, 47, whereas the radially outer portion of the retainer discs 120, 121 is in substantially linear contact with the disc valves 46, 47. The radially inner portion of the retainer discs 120, 121 is separated from or contacted with the disc valves 46, 47 with a slight force.

Figure 4:
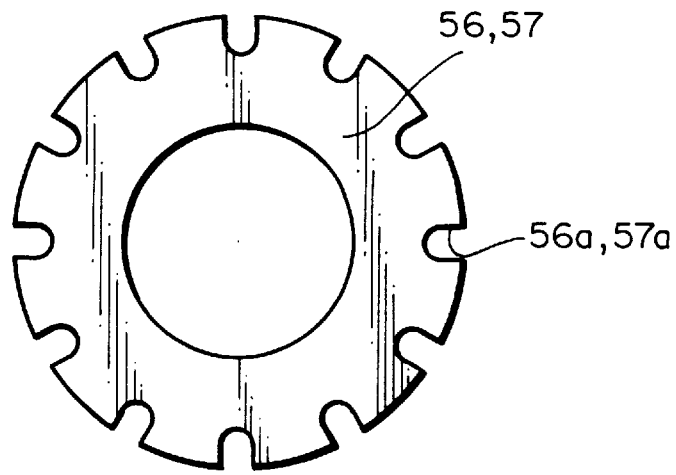
FIG. 4 is a plan view of a set of spring discs with a plurality of recesses.

As mentioned above, the outer peripheral edge of the seal discs 54, 55 is contacted with the lower surface of the seal rings 48, 49. Thus, the seal discs 54, 55 are engaged with the outer seal ridges 40, 41 through the seal rings 48, 49. The seal discs 54, 55 are contacted with the outer periphery of a plurality of spring discs or bias means 56, 57, whereby the seal discs 54, 55 are biased against the retainer discs 120, 121 and the seal rings 48, 49. The spring discs 56, 57 are arranged in stack. The inner periphery of the spring discs 56, 57 is secured to the inner seal ridges 36, 37. As shown in FIG. 4, a plurality of notches 56a, 57a are formed in the outer periphery of the spring discs 56, 57 so as to define oil passages. The retainer discs 120, 121, the seal discs 54, 55 and the spring discs 56, 57 cooperate with each other to form spaces S1, S2. These spaces S1, S2 are communicated with the pilot chambers 58, 59 through the notches 56a, 57a.

The overlapped region W between the seal discs 54, 55 and the retainer discs 120, 121 is preferably made as small as possible. An axial distance h between a contact portion between the retainer discs 120, 121 and the seal discs 54, 55 and a contact portion between seal discs 54, 55 and the seal rings 48, 49 is greater than maximum axial displacement of the disc valves 46, 47. This arrangement allows the inner peripheral edge of the seal discs 54, 55 to be normally held in contact with the lower surface of the retainer discs 120, 121.

The pilot chambers 58, 59 are defined by the peripheral wall of the valve bodies 26, 27, the spring discs 56, 57 and the end seals 28, 29. The seal discs 54, 55 and the spring discs 56, 57 collectively form a flexible partition.

Ports 60, 61 are formed in the peripheral wall of the guide member 30 and communicated with the pilot chambers 58, 59, respectively. Similarly, ports 62, 63 are formed in the peripheral wall of the guide member 30 and communicated with the oil chambers 25b, 25c, respectively. Notches 64, 65 are formed in the inner seal ridges 36, 37 of the valve bodies 26, 27. Grooves or upstream passages 66, 67 are formed in the outer periphery of the guide member 30. The notches 64, 65 are communicated with the pilot chambers 58, 59 through the grooves 66, 67 and the ports 60, 61. Reference numerals 123, 124 denote orifices of a constant cross-sectional area, i.e. fixed orifices, adapted to give resistance to the flow of oil to the grooves 66, 67.

A spool 68 is slidably fitted in the guide member 30 so as to adjust the effective cross sectional area between the ports 60, 62 and the effective cross sectional area between the ports 61, 63. The spool 68 is biased toward the actuator 28A under the bias of a compression spring 69. The actuator 28A has an operating rod 70 operable to move the spool 68 against the action of the compression spring 69 so as to adjust the effective cross sectional area of the ports 60, 63 (downstream passage and variable orifice).

Operation is as follows. In FIG. 2, solid arrows indicate the flow direction of oil during an extension process of the piston rod 6, whereas broken arrows indicate the flow direction of oil during a compression process of the piston rod 6.

During extension of the piston rod 6, the check valve 10 of the piston 5 is closed to thereby pressurize oil within the upper cylinder chamber 2a. As shown by the solid arrows, the oil is caused to flow out of the upper cylinder chamber 2a through the opening 16. The oil is then directed to the lower cylinder chamber 2b through the annular upper oil passage 15, the sleeve 21, the port 31 of the damper mechanism, the oil chamber 25a, the oil passage 34, the fixed orifice 123, the notch 64, the groove 66, the port 60, the port 62, the oil chamber 25b, the port 32, the sleeve 22, the annular lower oil passage 18, and the oil passage 19. At this time, the disc valve 46 is opened to allow the oil to flow from the oil chamber 25a directly to the oil chamber 25b through the oil passage 34, the groove 42 and the oil passage 44 when pressure within the upper cylinder chamber 2a reaches a predetermined level. During the extension process of the piston rod 6, a corresponding part of the oil within the cylinder 2 is caused to flow from the reservoir 4 to the base valve 8. The check valve 12 is then opened to allow such oil to flow to the lower cylinder chamber 2b.

When the piston is moved at a relatively low speed, and before the disc valve 46 is opened, damping resistance is varied depending upon the effective cross sectional areas of the fixed orifice 123, the notch 64, the groove 66 and the port 60. On the other hand, when the piston is moved at a relatively high speed, and the disc valve 46 is opened as a result of an increase in the pressure within the upper cylinder chamber 2a, damping resistance is varied depending upon the degree of opening of the disc valve 46.

If the seal disc 54 and the disc valve 46 are flexed toward the bottom of the valve body 26 as a result of an increase in the pressure within the pilot chamber 58, or if the radially disc valve 46 is opened, the inner portion of the retainer disc 120 is substantially free from deformation since the retainer disc 120 is axially separable from the disc valve 46. Moreover, the overlapped region W will in no way be changed since the maximum axial displacement of the disc valve 46 is less than the axial distance or height h, and the overlapped region W is sufficiently small. Also, if the seal disc 54 and the disc valve 46 are flexed toward the bottom of the valve body 26 as a result of an increase in the pressure within the pilot chamber 58 or if the disc valve 46 is opened, resistance between the seal disc 54 and the retainer disc 120 is restricted since no bias is applied from the retainer disc 120. The disc valve 46 is constantly held in substantially linear contact with the retainer disc 120 when the disc valve 46 is opened and closed. Thus, resistance between the disc valve 46 and the retainer disc 120 is restricted.

When an electric current is applied to the actuator 28A, the spool 68 is moved to thereby adjust the effective cross sectional area of the port 60 and thus, damping resistance. If the effective cross sectional area of the port 60 is decreased, the pressure within the pilot chamber 58 upstream of the port 60 is increased as a result of a greater loss of pressure. Thus, a higher pressure is required to open the disc valve 46. If, on the other hand, the effective cross sectional area of the port 60 is increased, the pressure within the pilot chamber 58 upstream of the port 60 is decreased as a result of lesser pressure loss. The disc valve 46 can thus be opened under lower pressure. A change in the effective cross sectional area of the port 60 results in a corresponding change in pressure necessary to open the disc valve 46. As such, damping characteristics can be varied over a full range of piston speed.

During a compression process, as the piston 5 is moved, the check valve 10 is opened to allow oil to flow from the lower cylinder chamber 2b directly to the upper cylinder chamber 2a through the oil passage 9. Since the pressure within the upper cylinder chamber 2a is substantially equal to that within the lower cylinder chamber 2b, no oil flows between the ports 31, 32 in the damper mechanism 24. As the piston rod 6 is moved toward the base valve 8, the check valve 12 is closed. Oil within the cylinder 2 is pressurized by a mount corresponding to displacement of the piston rod 6. The pressurized oil is then directed from the lower cylinder chamber 2b through the oil passage 19, the annular lower oil passage 18 and the sleeve 22 to the port 32. The oil is then caused to flow to the reservoir 4 through the port 32, the oil chamber 25b, the oil passage 35, the fixed orifice 124, the notch 65, the groove 67, the port 61, the port 63, the oil chamber 25c, the port 33 and the hole 23. When pressure within the cylinder 2 is increased to a predetermined level, the disc valve 47 is opened to allow the oil to flow from the oil chamber 25b to the oil chamber 25c through the oil passage 35, the groove 43 and the oil passage 45.

During the compression process, when the piston 5 is moved at a relatively low speed, and before the disc valve 47 is opened, damping resistance is varied depending upon the effective cross sectional areas of the fixed orifice 124, the notch 65, the groove 67 and the port 63. On the other hand, when the piston 5 is moved at a relatively high speed, and the disc valve 47 is opened as a result of an increase in the pressure within the cylinder 2, damping resistance is varied depending upon the degree of opening of the disc valve 47.

Frictional resistance between the seal disc 55 and the retainer disc 121 is restricted during the compression process as well as during the extension process. Frictional resistance between the disc valve 47 and the retainer disc 121 is also restricted.

The spool 68 is moved to vary the effective cross sectional area of the port 63 to adjust orifice characteristic. The resulting loss of pressure is utilized to change the pressure within the pilot chamber 59 and thus, pressure necessary to open the disc valve 47 to adjust valve characteristic. Thus, the damping characteristics can be varied over a full range of piston speed.

By moving the spool 68 to vary the effective cross sectional area of the respective ports 60, 63, damping characteristics can be varied separately during the extension and compression processes. Lands may be formed in the ports 60, 63 and the spool 68 so that the effective cross sectional area of the port 60 is greater than that of the port 63 or vice versa in response to position of the spool 68 during the extension and compression processes. In such a way, the hydraulic shock absorber enjoys a combination of hard suspension during an extension process and soft suspension during a compression process or vice versa.

According to the first embodiment of the present invention, the pilot chambers 58, 59 can be defined without the use of any sliding parts. This arrangement avoids leakage of oil from the pilot chambers 58, 59 and provides stable damping characteristics. A change in temperature has little effect on damping resistance. This embodiment also eliminates the need to machine sliding parts with high accuracy and thus, brings about a reduction in the fabrication cost of the hydraulic shock absorber. Moreover, the inner seal ridges 36, 37, the valve seats 38, 39 and the outer seal ridges 40, 41 are integrally formed in the valve bodies 26, 27. This minimizes errors in the height of these parts and allows the disc valves 46, 47 to be opened under substantially constant pressure.

When the seal discs 54, 55 and the disc valves 46, 47 are flexed and opened, the retainer discs 120, 121 are substantially free from deformation and axially separated from the disc valves 46, 47 thereby to restrict frictional resistance between the seal discs 54, 55 and the retainer discs 120, 121. Pressure within the pilot chambers 58, 59 is applied to the disc valves 46, 47 only through the radially outer portion of the retainer discs 120, 121. This arrangement provides stable damping characteristics.

If the seal discs 54, 55 are brought into contact with the retainer discs 120, 121 at an acute angle, the radial distance of the contact portion between the discs 54, 120 and 55, 121 is subject to a small change. Thus, the inner pressure within the pilot chambers 58, 59 is exerted on a substantially constant area in the disc valves 46, 47 to thereby provide stable damping resistance.

Pressure within the spaces S1, S2 is constantly equal to that within the pilot chambers 58, 59 as they are communicated with each other through the notches 56a, 57a. This communication avoids an increase in frictional resistance between the spring discs 56, 57, the seal discs 54, 55, the retainer discs 120, 121 and the disc valves 46, 47 which may, otherwise, occur if the volume of the spaces S1, S2 is decreased as a result of an increase in the pressure within the pilot chambers 58, 59. Lower frictional resistance enables the disc valves 46, 47 to be smoothly operated to provide constant damping resistance. In lieu of the notches 56a, 57a, through apertures may be formed in the spring discs 56, 57 to provide a fluid communication between the spaces S1, S2 and the pilot chambers 58, 59.

In the first embodiment, the spacers 200, 201 are used to guide the inner periphery of the retainer discs 120, 121 whereby the retainer discs 120, 121 are axially movable to and from the disc valves 46, 47. The present invention is not limited thereto. For example, the inner periphery of the retainer discs 46, 47 may be sandwiched between the spacers 200, 201 and the spring discs 56, 57 whereby the retainer discs 120, 121 may be separated from the disc valves 46, 47. This alternative arrangement also restricts frictional resistance between the disc valves and the retainer discs when the disc valves are flexed and opened.

Also, in the first embodiment, the seal rings 48, 49 are contacted with the outer seal ridges 40, 41 of the valve bodies 26, 27, and the seal discs 54, 55 are contacted with the seal rings 48, 49. Alternatively, the seal discs 54, 55 may be directly contacted with the outer seal ridges 40, 41 by the omission of the seal rings 48, 49.

Figure 5:
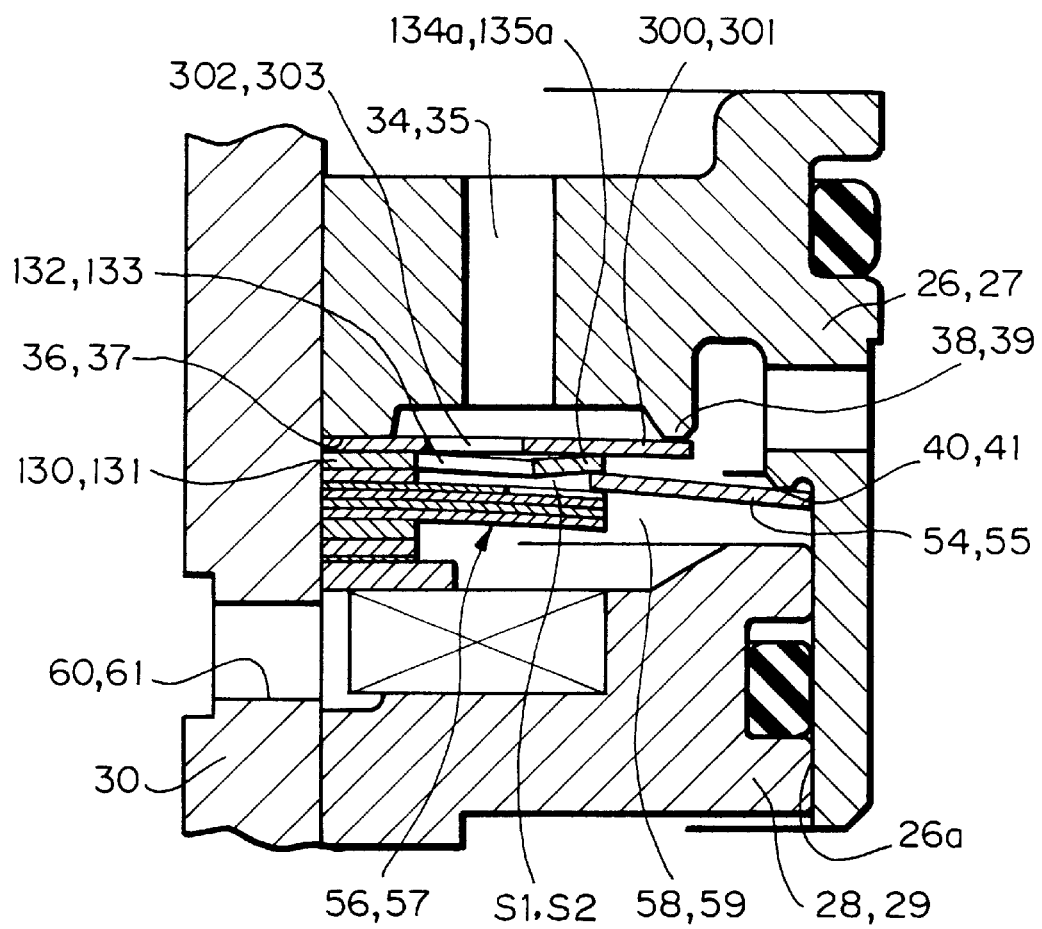
FIG. 5 is a view similar to that of FIG. 3, but showing a primary damper valve and a pilot chamber used in a second embodiment of the present invention.
Figure 6:
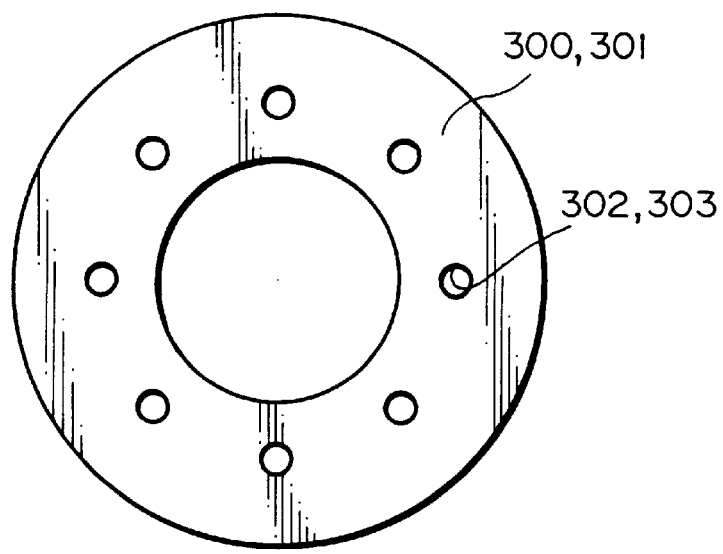
FIG. 6 is a plan view of a disc valve shown in FIG. 5.
Figure 7:
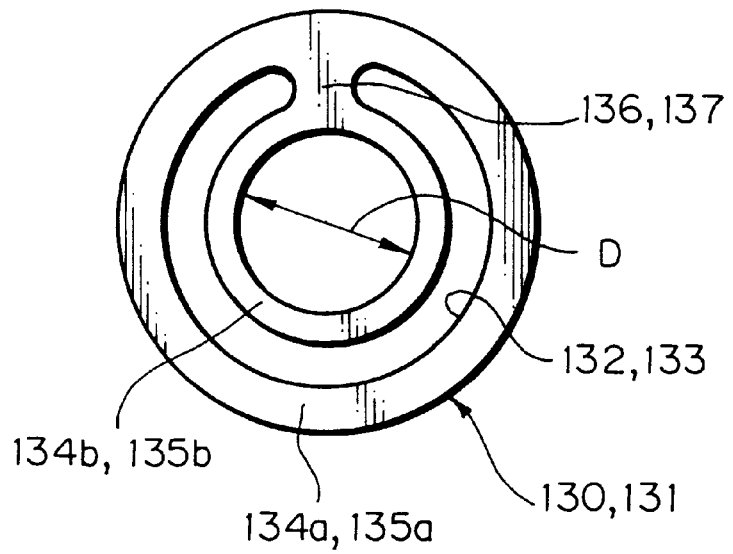
FIG. 7 is a plan view of a retainer disc shown in FIG. 5.

Referring next to FIGS. 5 to 7, there is shown a hydraulic shock absorber according to a second embodiment of the present invention. The second embodiment is generally similar in construction to the first embodiment, except for oil passages or upstream passages communicated with the pilot chambers 58, 59 of the damper mechanism 24 as well as the shape of the retainer discs. Like parts are given like reference numerals used in FIGS. 1 to 4.

As shown in FIGS. 5 to 8, a damper mechanism of the second embodiment differs from that of the first embodiment in that in the former, the seal discs 54, 55 are directly contacted with the outer seal ridges 40, 41 by the omission of the seal rings 48, 49. Additionally, the second embodiment avoids the use of notches 64, 65 formed in the inner seal ridges 36, 37, the grooves 66, 67 formed in the guide member 30, and the fixed orifices 123, 124. Instead, a plurality of fixed orifices 302, 303 are formed in disc valves 300, 301 as shown in FIG. 6. Also, the retainer discs 120, 121 are replaced by apertured discs 130, 131 as shown in FIG. 7. The apertured discs 130, 131 include substantially C-shaped passages 132, 133 adapted to provide a fluid communication between the fixed orifices 302, 303, the notches 56a, 57a of the spring discs 56, 57 and the spaces S1, S2.

The inner periphery of the apertured discs 130, 131 is secured to the inner seal ridges 36, 37 through the disc valves 300, 301. The apertured discs 130, 131 are formed by a punching technique. The apertured discs 130, 131 have an inner diameter D equal to the outer diameter of the guide member 30. The apertured discs 130, 131 include outer rings 134a, 135a (corresponding to the retainer discs) sandwiched between the disc valves 300, 301 and the seal discs 54, 55, inner rings 134b, 135b fitted around the guide member 30, and radial members 136, 137 extending between the outer rings 134a, 135a and the inner rings 134b, 135b. The outer rings 134a, 135a, except for a portion of the outer rings 134a, 135a adjacent to the radial members 136, 137, are axially separable from the disc valves 300, 301 when the disc valves 300, 301 are flexed or opened. That is, a radially inner portion of the outer rings 134a, 135a is axially separated from the disc valves 300, 301, while a radially outer portion of the outer rings 134a, 135a contacts the disc valves 300, 301, when the disc valves 300, 301 are opened. This arrangement prevents application of bias from the apertured discs 130, 131 to the disc valves 300, 301 and minimizes frictional resistance between the disc valves 300, 301 and the apertured discs 130, 131 when the disc valves 300, 301 are opened. The pilot chambers 58, 59 and the oil passages 34, 35 formed upstream of the disc valves 300, 301 are communicated with each other through the notches 56a, 57a of the spring discs 56, 57, the spaces S1, S2 and the fixed orifices 302, 303.

The foregoing arrangement allows oil to flow from the oil passages 34, 35 through the fixed orifices 302, 303 to the pilot chambers 58, 59 and thus, offers substantially the same advantages as the first embodiment.

The fixed orifices 302, 303 allow oil to directly and smoothly flow between the spaces S1, S2 and the pilot chambers 58, 59. This arrangement enables ready release of air from the pilot chambers when oil is introduced or during assembly of the hydraulic shock absorber. Conveniently, the upstream passages and the fixed orifices are formed in the disc valves by using a punching technique, rather than by machining the valve bodies and the guide member to form the notches and the grooves therein as in the first embodiment. Moreover, damping characteristics can be changed simply by changing the diameter of the fixed orifices 302, 303. The apertured discs 130, 131 can be positioned or centered simply by fitting the apertured discs 130, 131 around the guide member 30.

In this embodiment, the fixed orifices 302, 303 of the disc valves 300, 301 act as the fixed orifices for the upstream passages. Alternatively, the notches 56a, 57a of the spring discs 56, 57 may act as the fixed orifices. Still alternatively, there may be employed a combination of the fixed orifices 302, 303 and the notches 56a, 57a.

Figure 9:
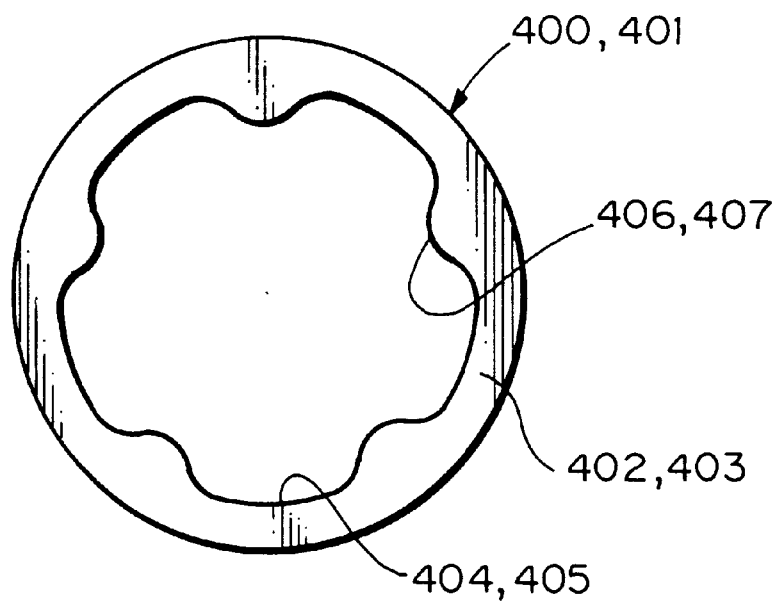
FIG. 9 is a plan view of a retainer disc shown in FIG. 8.
Figure 8:
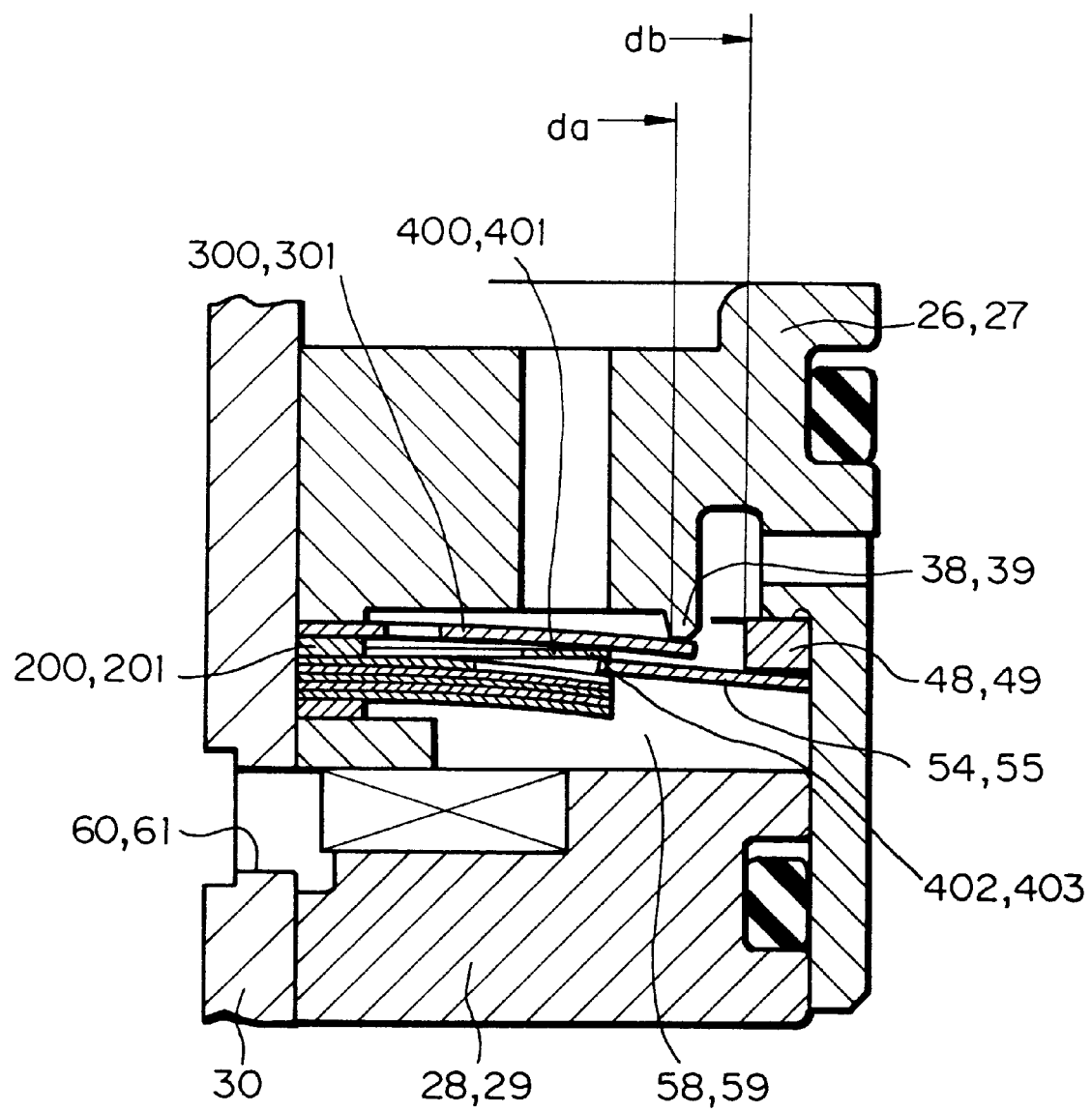
FIG. 8 is a view similar to that of FIG. 5, but showing a modified form of the primary damper valve and pilot chamber.

As an alternative to the second embodiment, the apertured discs 130, 131 shown in FIG. 7 may be replaced by annular retainer discs shown in FIGS. 8 and 9. Retainer discs 400, 401 include rings, 402, 403 sandwiched between the disc valves 300, 301 and the seal discs 54, 55, a plurality of recesses 404, 405 and a plurality of projections 406, 407 between adjacent recesses 404, 405. The retainer discs 400, 401 are formed by punching a plate. The projections 406, 407 are guided along the thick spacers 200, 201 and axially separable from the disc valves 300, 301. This alternative arrangement functions in the same manner as and offers the same advantages of the second embodiment. Only the projections 406, 407 of the retainer discs 400, 401 are contacted with the spacers 200, 201, whereas the entire inner periphery of the retainer discs 120, 121 in the first embodiment is contacted with the spacers 200, 201 during sliding. Thus, this alternative arrangement facilitates separation of the retainer discs 400, 401 axially from the disc valves 300, 301 and gives stable damping resistance.

The seal rings 48, 49 have an inner diameter db. The valve seats 38, 39 have an inner diameter da. Preferably, a ratio of the inner diameter db to the inner diameter da is greater than zero and less than or equal to 1.2 (i.e., $0 < db/da \leq 1.2$) as typically shown in FIG. 8. This arrangement allows an optimal pressure to be exerted on the disc valves 300, 301 from the pilot chambers so as to provide optimal damping characteristics during hard suspension.

As discussed above, in the hydraulic shock absorber of the present invention, a change in the effective cross sectional area of the downstream passage through the variable orifice results in a corresponding change in the effective cross sectional area of a fluid path between the upper and lower cylinder chambers. Such a change enables adjustment of damping characteristics. A change in the internal pressure within the pilot chamber in response to a loss of pressure through the variable orifice results in a corresponding change in pressure necessary to open the damper valve. Such a change also enables adjustment of damping characteristics. The pilot chamber is defined without the use of any sliding parts. This arrangement minimizes the possibility of oil leakage from the pilot chamber and ensures stable damping characteristics, regardless of a change in temperature. There is no need to machine or process sliding parts with high accuracy. This results in a decrease in the fabrication cost of the shock absorber. The annular retainer disc, downstream of the disc valve, is less in diameter than the valve seat and has an inner periphery axially separable from the disc valve. The flexible partition is disposed downstream of the retainer disc and flexed toward the disc valve under the internal pressure within the pilot chamber so as to urge the disc valve into a closed position through the retainer disc. As the retainer disc is axially separable from the disc valve, the retainer disc is free from deformation and will in no way urge the disc valve when the disc valve is flexed and opened. This results in a decrease in frictional resistance between the disc valve and the retainer disc.

The entire disclosure of Japanese patent application No. Hei 9-276385 filed on Sep. 24, 1997 is incorporated herein by reference in its entirety.

Although the present invention has been described with respect to its preferred embodiments, it is to be understood that various modifications and changes may be made without departing from the scope of the invention as defined by the appended claims.

What is claimed is:

1. A valve system for a damper mechanism, comprising:
   a casing;
   a guide member disposed within said casing;
   a valve body disposed within said casing, the valve body including:
   (i) an inner peripheral portion fitted around said guide member;
   (ii) an outer peripheral portion contacting said casing;
   (iii) a recess defined between said outer peripheral portion and said guide member;

(iv) a passage extending through the valve body; and (v) a valve seat disposed radially outwardly of said passage and extending towards said recess;

an end seal fitted in said recess and spaced from said valve seat;

a disc valve fitted around said guide member and disposed within said recess between said valve body and said end seal, wherein the disc valve is movable from a first position in which it is seated on said valve seat to a second position in which it is spaced from said valve seat, to thereby close and open said passage, respectively;

a retainer disc disposed around said guide member and located within said recess between said disc valve and said end seal, wherein the retainer disc has a first portion that is axially freely movable relative to said disc valve, and a second portion that remains in contact with said disc valve when said disc valve is in said second position;

a partition disposed around said guide member and located within said recess between said end seal and said retainer disc, the partition and said end seal cooperating with one another to form a pilot chamber, wherein the partition is capable of being flexed, via pressure within said pilot chamber, against said retainer disc such that said retainer disc urges said disc valve to said first position; and a plurality of passages for placing said passage in fluid communication with said pilot chamber.

2. The valve system of claim 1, wherein said valve body further includes an outer seal ridge located radially outwardly of said valve seat, and said valve system further comprises an annular seal ring in contact with said outer seal ridge.

3. The valve system of claim 2, wherein said valve body further includes an inner seal ridge extending towards said end seal, and said valve system further comprises a spacer surrounded by said retainer disc, fitted around said guide member and attached to said inner seal ridge, such that said first portion of said retainer disc is axially freely movable relative to said disc valve along said spacer.

4. The valve system of claim 3, wherein said first portion of said retainer disc is axially freely movable into contact with said disc valve.

5. The valve system of claim 4, wherein said spring disc includes a plurality of stacked leaf springs.

6. The valve system of claim 5, wherein said spring disc has a notch in an outer peripheral portion thereof, and said retainer disc, said seal disc and said spring disc cooperate with one another to form a space that is in fluid communication with said pilot chamber via said notch.

7. The valve system of claim 3, wherein said inner peripheral portion of said seal disc and said second portion of said retainer disc contact each other over a small area as compared to the total area of said seal disc and said retainer disc.

8. The valve system of claim 3, and further comprising a seal ring disposed within said valve body radially outwardly of said valve seat, and wherein said seal disc further includes an outer peripheral portion contacting said seal ring such that said inner peripheral portion of said seal disc is axially displaced relative to said outer peripheral portion of said seal disc by a predetermined distance that is greater than the distance said disc valve travels from said first position to said second position.

9. The valve system of claim 1, wherein said valve body further includes an inner seal ridge in said inner peripheral portion of said valve body and extending towards said end seal, and said plurality of passages includes:

(i) a notch in said inner seal ridge;

(ii) a fixed orifice in fluid communication with said notch;

(iii) a port extending through said guide member and in fluid communication with said pilot chamber; and (iv) a groove formed in an outer peripheral surface of said guide member and in fluid communication with said notch and said port.

10. The valve system of claim 9, wherein said first portion is located radially inwardly of said second portion.

11. The valve system of claim 10, wherein said plurality of passages includes:

(i) an orifice extending through said disc valve;

(ii) a C-shaped passage, defined between said inner ring and said outer ring, in fluid communication with said orifice;

(iii) a space defined between said apertured disc, said seal disc and said spring disc, in fluid communication with said C-shaped passage; and (iv) a notch, formed in an outer peripheral portion of said spring disc, in fluid communication with said space and said pilot chamber.

12. The valve system of claim 9, wherein said valve body further includes an outer seal ridge located radially outwardly of said valve seat, and wherein said flexible partition includes a spring disc and a seal disc having an outer peripheral portion and an inner peripheral portion, with the outer peripheral portion contacting said outer seal ridge while the inner peripheral portion is sandwiched between said apertured disc and said spring disc.

13. The valve system of claim 1, wherein said disc valve includes an outer peripheral portion, and wherein said partition includes a spring disc and a seal disc having an inner peripheral portion, with said seal disc located within said recess such that said second portion of said retainer disc is sandwiched between said inner peripheral portion of said seal disc and said outer peripheral portion of said disc valve.

14. The valve system of claim 13, wherein said valve body further includes a seal ridge located radially outwardly of said valve seat, said valve system further comprises an annular seal ring in contact with said seal ridge, and said seal disc further includes an outer peripheral portion contacting said annular seal ring with said inner peripheral portion of said seal disc sandwiched between said retainer disc and said spring disc.

15. The valve system of claim 14, wherein said valve body further includes an inner seal ridge extending towards said end seal, said spring disc includes an inner peripheral portion fitted around said guide member and an outer peripheral portion contacting said inner peripheral portion of said seal disc to urge said seal disc against said retainer disc and said seal ring.

16. The valve system of claim 1, wherein said second portion remains in contact with said disc valve at a location radially inwardly of said valve seat.

17. The valve system of claim 1, wherein said retainer disc is annular with said first portion being located radially inwardly of said second portion.

18. The valve system of claim 1, wherein said retainer disc is annular and has a diameter less than that of said valve seat.

19. A hydraulic shock absorber, comprising:

a cylinder filled with a hydraulic fluid;

a piston slidably disposed within said cylinder;

a piston rod connected to said piston and extending from said cylinder;

a passage through which the hydraulic fluid flows in response to sliding movement of said piston;

a valve system arranged in said passage, the valve system including:
(i) a valve body having a valve seat and an opening extending through said valve body, wherein said opening is in fluid communication with said passage;
(ii) a disc valve that is movable from a first position in which it is seated on said valve seat to a second position in which it is spaced from said valve seat, to thereby close and open said passage, respectively;
(iii) a pilot chamber, located downstream of said opening, for maintaining a pressure therein that is applied to said valve and forces said disc valve to said first position;
(iv) a variably sized orifice, located downstream of said pilot chamber, for adjusting an effective cross sectional area of said passage;
(v) a retainer disc disposed downstream of said disc valve and having a first portion that is axially freely movable relative to said disc valve, and a second portion that remains in contact with said disc valve when said disc valve is in said second position; and
(vi) a partition disposed downstream of said retainer disc and defining a boundary of said pilot chamber, wherein pressure within said pilot chamber flexes the partition against said retainer disc such that said second portion of said retainer disc is urged against said disc valve, whereby said disc valve is urged to said first position.

20. The hydraulic shock absorber of claim 19, wherein said partition includes a seal disc and a spring disc.

21. The valve system of claim 20, wherein said retainer disc is annular and said disc valve is annular, and wherein said annular retainer disc is sandwiched between said seal disc and said annular disc valve, and includes an inner peripheral surface defined by a plurality of alternating recesses and projections, with said projections defining said first portion.

22. The hydraulic shock absorber of claim 19, wherein said hydraulic fluid is oil.

23. The hydraulic shock absorber of claim 19, wherein said disc valve is annular.

24. The hydraulic shock absorber of claim 19, wherein said retainer disc is annular and has an outer diameter that is less than a diameter of said valve seat, with said first portion being located radially inwardly of said second portion.

25. A valve system, comprising:
a valve body having a valve seat projecting therefrom in a first direction, and a fluid passage extending through said valve body in said first direction;
a supporting member for supporting said valve body;
a first valve element having a first portion and a second portion, with said first portion being removably seated on said valve seat and said second portion supported by said supporting member, wherein said fluid passage is closed when said first portion is seated on said valve seat;

a second valve element having a first portion supported by said supporting member and a second portion contacting said first valve element when said first valve element is not seated on said valve seat, wherein said first valve element is positioned between said valve seat and said second valve element, and wherein said first portion of said second valve element is freely movable relative to said first valve element; and a third valve element for urging said second portion of said second valve element towards said valve seat.

26. The valve system of claim 25, wherein said valve body surrounds said supporting member, said firs portion of said first valve element is located radially inwardly of said second portion of said first valve element, and said first portion of said second valve element is located radially inwardly of said second portion of said second valve element.

27. A valve system for a damper mechanism, comprising:
a casing;
a guide member disposed within said casing;
a valve body disposed within said casing, the valve body including:
(i) an inner peripheral surface fitted around said guide member;
(ii) an outer peripheral surface contacting said casing;
(iii) a recess defined between said outer peripheral surface and said guide member;
(iv) a passage extending through the valve body; and
(v) a valve seat disposed radially outwardly of said oil passage and extending towards said recess;

an end seat fitted in said recess and spaced from said valve seat;

a disc valve fitted around said guide member and disposed within said recess between said valve body and said end seal, wherein the disc valve is movable from a first position in which it is seated on said valve seat to a second position in which it is spaced from said valve seat, to thereby close and open said oil passage, respectively;

an apertured disc located within said recess between said disc valve and said end seal, the apertured disc including an inner ring fitted around said guide member and an outer ring interconnected to said inner ring, wherein the outer ring includes a first portion that is axially spaced from said disc valve and a second portion that remains in contact with said disc valve when said disc valve is in said second position;

a partition disposed around said guide member and located within said recess between said end seal and said apertured disc, the partition and said end seal cooperating with one another to form a pilot chamber, wherein the partition is capable of being flexed, via pressure within the pilot chamber, against said apertured disc such that said apertured disc urges said disc valve to said first position; and a plurality of passages for placing said passage in fluid communication with said pilot chamber.

* * * * *